US008757739B2

(12) United States Patent
Chen et al.

(10) Patent No.: US 8,757,739 B2
(45) Date of Patent: Jun. 24, 2014

(54) COMPUTER CASE (75) Inventors: Yun-Lung Chen, New Taipei (TW);
Liang-Chin Wang, New Taipei (TW);
Yu-Ming Xiao, Wuhan (CN); Wei Yin,
Wuhan (CN)

(73) Assignees: **Hong Fu Jin Precision Industry
(WuHan) Co., Ltd., Wuhan (CN); Hon
Hai Precision Industry Co., Ltd.**, New
Taipei (TW)

( * ) Notice: Subject to any disclaimer, the term of this patent is extended or adjusted under 35 U.S.C. 154(b) by 6 days.

(21) Appl. No.: 13/587,938

(22) Filed: Aug. 17, 2012

(65) Prior Publication Data
US 2013/0169128 A1 Jul. 4, 2013

(30) Foreign Application Priority Data

Dec. 30, 2011 (CN) .......................... 2011 1 0453006

(51) Int. Cl.
*A47B 81/00* (2006.01)
(52) U.S. Cl.
USPC ....................................... 312/223.2; 312/263
(58) Field of Classification Search
USPC ................ 312/263–264, 265.5–265.6, 223.2; 361/679.02
See application file for complete search history.

(56) References Cited

U.S. PATENT DOCUMENTS

| 6,367,896 | B1 * | 4/2002 | Peng et al. .................. 312/223.2 |
| 7,012,804 | B2 * | 3/2006 | Yokote et al. ............ 361/679.33 |
| 7,272,011 | B2 * | 9/2007 | Chen et al. ..................... 361/726 |
| 7,374,259 | B2 * | 5/2008 | Wu et al. ..................... 312/223.2 |
| 7,420,812 | B2 * | 9/2008 | Chen et al. ..................... 361/724 |
| 7,428,146 | B2 * | 9/2008 | Han ......................... 361/679.55 |
| 7,483,264 | B2 * | 1/2009 | Chen et al. .............. 361/679.57 |
| 2007/0075613 | A1 * | 4/2007 | Mau ........................... 312/223.2 |
| 2008/0174946 | A1 * | 7/2008 | Chen et al. ..................... 361/683 |
| 2008/0225475 | A1 * | 9/2008 | Zhang et al. .................. 361/683 |
| 2009/0147452 | A1 * | 6/2009 | Zhang et al. ............. 361/679.02 |
| 2011/0127890 | A1 * | 6/2011 | Yeh et al. ................... 312/223.2 |
| 2012/0049700 | A1 * | 3/2012 | Cochrane ................... 312/223.2 |

* cited by examiner

*Primary Examiner* — Hanh V Tran
(74) *Attorney, Agent, or Firm* — Novak Druce Connolly Bove + Quigg LLP (57) ABSTRACT A computer case includes a main body and a sidewall assembled to the main body. The main body includes a bottom plate and two side plates extending upwardly from two opposite edges of the bottom plate. Each side plate includes a positioning portion, and a latching part defined on the positioning portion. The side plate adjacent to the latching part also includes a sliding groove. The latching part and the sliding groove are used for securing different kinds of side plates respectively.

16 Claims, 9 Drawing Sheets

COMPUTER CASE

BACKGROUND

1. Technical Field

The present disclosure generally relates to an electronic device case, and more particularly to a computer case providing convenient installation of various data storage device.

2. Description of the Related Art

A personal computer frequently includes a case, with a lateral opening, for receiving various data storage devices (for example, hard disk drives, floppy disks, and CD-ROM drives, etc), and a sidewall is usually employed to engage with the main body, thereby cover the lateral opening of the case.

According to the demands of market, two different types of computer cases are provided, as a rotating type structure and a pushing type structure. The rotating type structure includes a rotatable sidewall and a main body, the rotatable sidewall is made of galvanize-steel plate with a thickness of 0.08 millimeter (mm), and the rotatable sidewall can be rotated to engage with the main body. The pushing type structure includes a pushable sidewall and a main body, the pushable sidewall is made of galvanize-steel plate with a thickness of 0.06 mm, and the pushable sidewall is capable of being horizontally pushed to engage with the main body.

Due to that main bodies with different configurations are needed to respectively satisfy and engage with the rotatable sidewall and pushable sidewall, and different molds are also needed for manufacturing the main bodies with different configurations, the cost of designing different molds is relatively expensive.

Therefore, it is desirable to provide a computer case with a main body applicable for different types of sidewall.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present computer case. Moreover, in the drawings, like reference numerals designate corresponding parts throughout the views.

DETAILED DESCRIPTION

Figure 1:
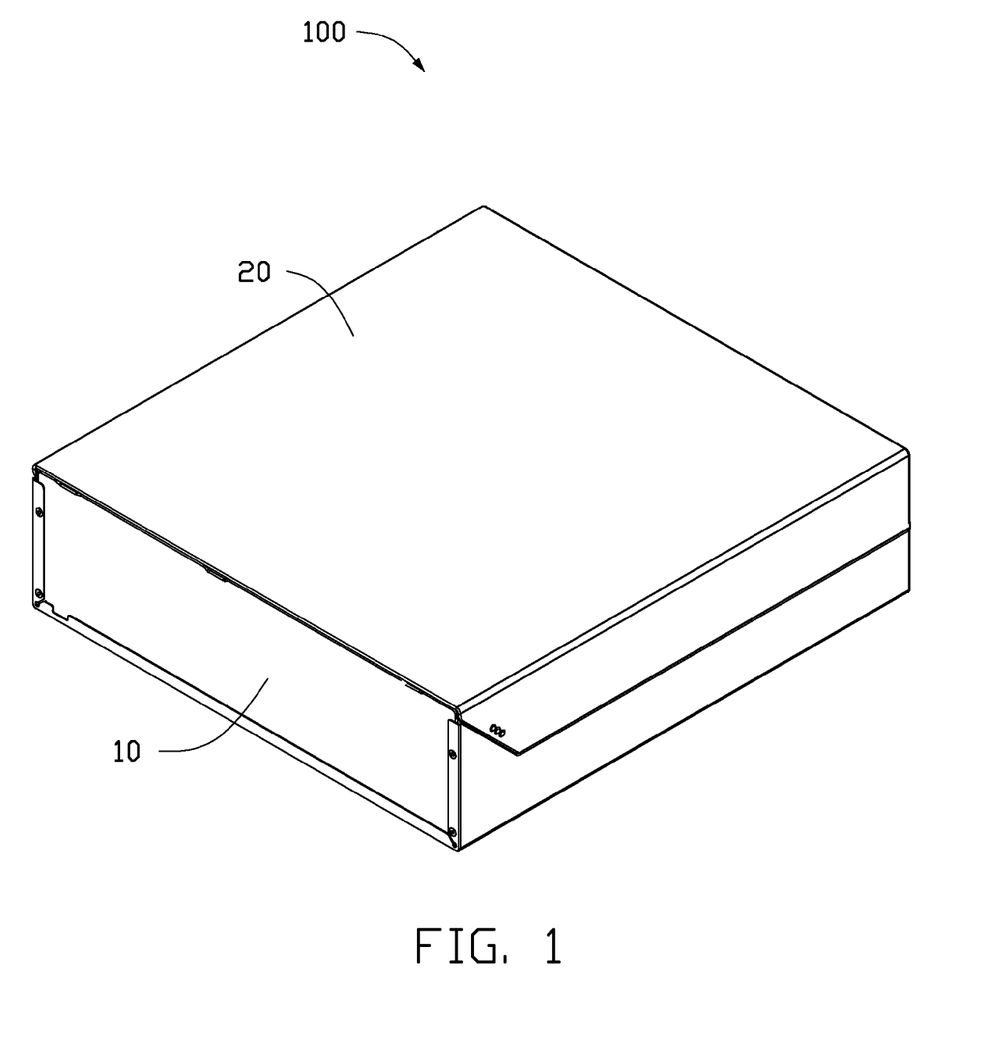
FIG. 1 is an assembled, isometric view of a computer case in accordance with an embodiment of the disclosure.

Referring to FIG. 1, a computer case 100 in accordance with an exemplary embodiment is provided. The computer case 100 includes a main body 10 and a sidewall 20 disposed on the main body 10. The main body 10 and the sidewall 20 are engaged together to form a cavity 30 for receiving hard disk drives, floppy disks, and CD-ROM drives, etc).

Figure 2:
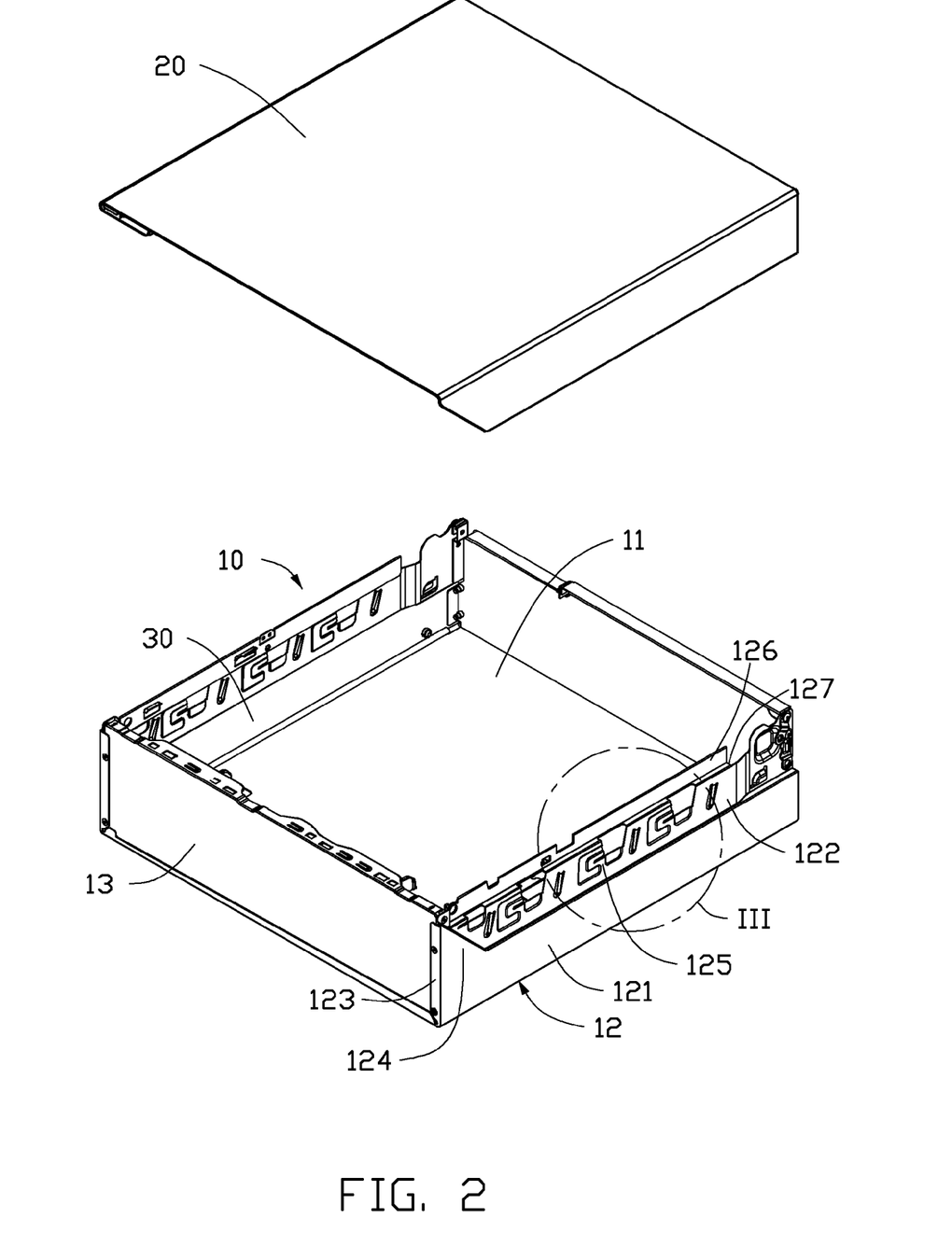
FIG. 2 is an exploded view of the computer case of FIG. 1.
Figure 3:
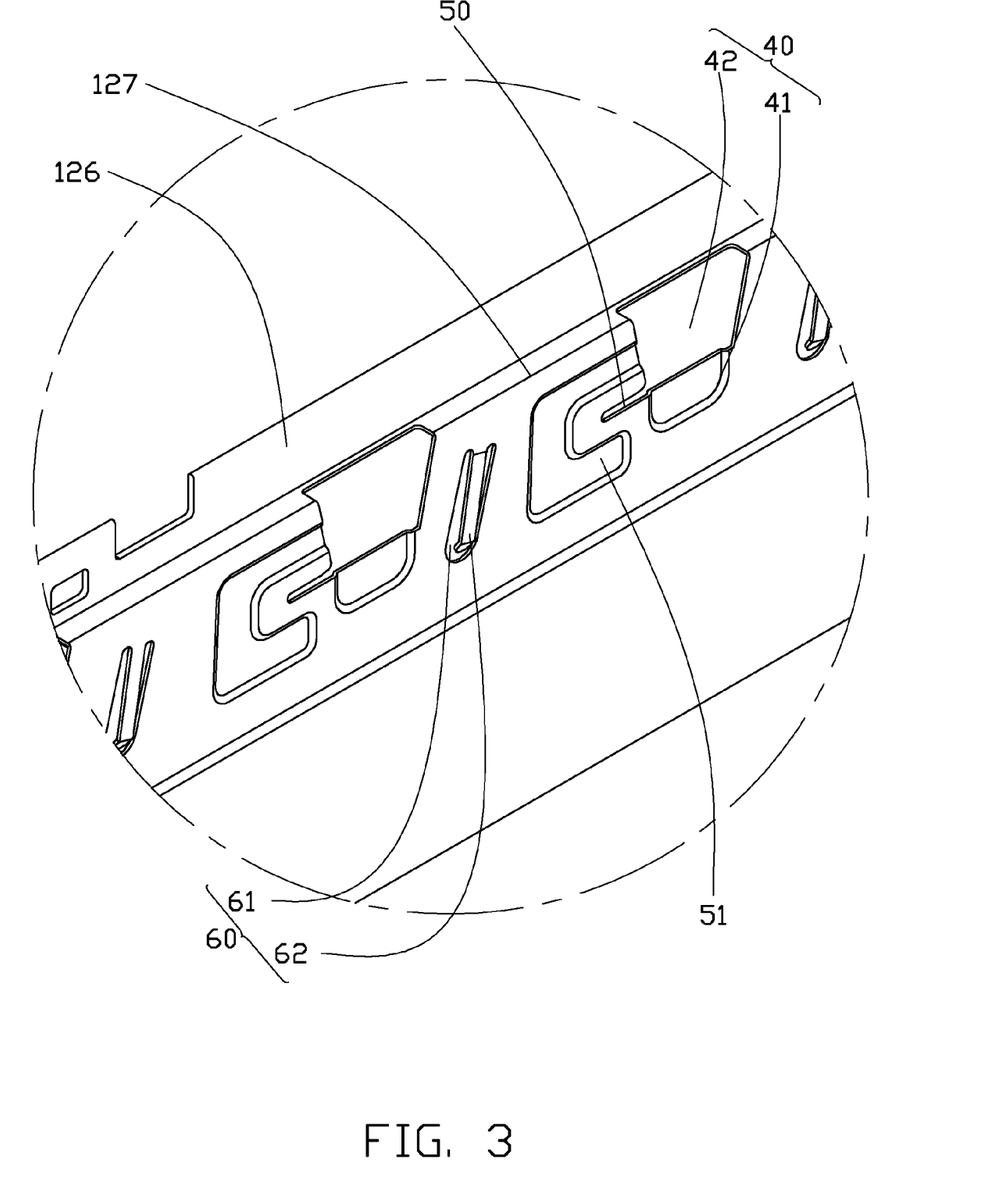
FIG. 3 is an enlarged view of part of the computer case of FIG. 2.

Referring to FIGS. 2 and 3, the main body 10 includes a square shaped bottom plate 11, two side plates 12 extending upwardly and vertically from two opposite edges of the bottom plate 11, and two side boards 13 extending upwardly and vertically from another two opposite edges of the bottom plate 11. The bottom plate 11 is square shaped, and the side plates 12 are vertical with the side boards 13.

Specifically, the two side plates 12 are parallel to each other. Each side plate 12 includes a first part 121, and a second part 122 extending upwardly to the sidewall 20 from an inner edge of the first part 121.

The first part 121 includes two hems 123 and a resisting portion 124, the two hems 123 extending vertically from two sides of the first part 121 toward the side board 13. The two hems 123 are used for fixing the side plates 121 with the side board 13 via screws. The resisting portion 124 extends upwardly towards the sidewall 20. In this embodiment, the resisting portion 124 has a right-angled triangle shape. A periphery of the resisting portion 124 near to the second part 122 is a hypotenuse of the right-angled triangle.

Each second part 122 includes at least one positioning portion 125 arranged averagely. In this embodiment, the number of the positioning portion 125 is four. Each positioning portion 125 includes a latching part 40 and a sliding groove 50 for fastening different types of the sidewalls 20 respectively. In this embodiment, the second part 122 has an approximately right-triangle shape. A periphery of the second part 122 near to the resisting portion 124 is a hypotenuse.

The latching part 40 includes a latching plate 41 and a perforation 42 adjacent to a top edge of the latching plate 41. The latching plate 41 of one side plate 12 is depressed inwardly and towards the other side plate 12. The depressed latching plate 41 can strengthen the stability of the second part 122. In this embodiment, the latching plate 41 is rectangular, and the perforation 42 is inverted trapezoidal shaped.

The sliding groove 50 is a gap extending horizontally, the sliding groove 50 is located at a side of the latching plate 41, near to a bottom of the perforation 42, and communicated to a bottom of the perforation 42. The sliding groove 50 is also located at a side of the second part 122 near to the resisting portion 124.

An elastic structure 60 is disposed between each two adjacent positioning portions 125. The elastic structure 60 includes a linear hole 61 and an elastic slice 62 extending in the hole 60. In this embodiment, the elastic slice 62 can be used for preventing from electromagnetic interference (EMI) via contacting the sidewall 20. The elastic slice 62 of one side plate 12 extends outwardly and obliquely from the outer surface of the second part 122 along a direction away from the other side plate 12.

The side plate 12 further includes a third part 126, and a connecting plate 127 connecting the third part 126 with the second part 122. The third part 126 extends upwardly from a top side of the second part 122 and be attached to the sidewall 20. The connecting plate 127 is vertical to the second part 122 and the third part 126. A part of the connecting plate 127, corresponding to the perforation 42, are depressed toward the third part 126.

The sidewall 20 provided in this disclosure includes a rotatable sidewall 70 and a pushable sidewall 80.

Figure 4:
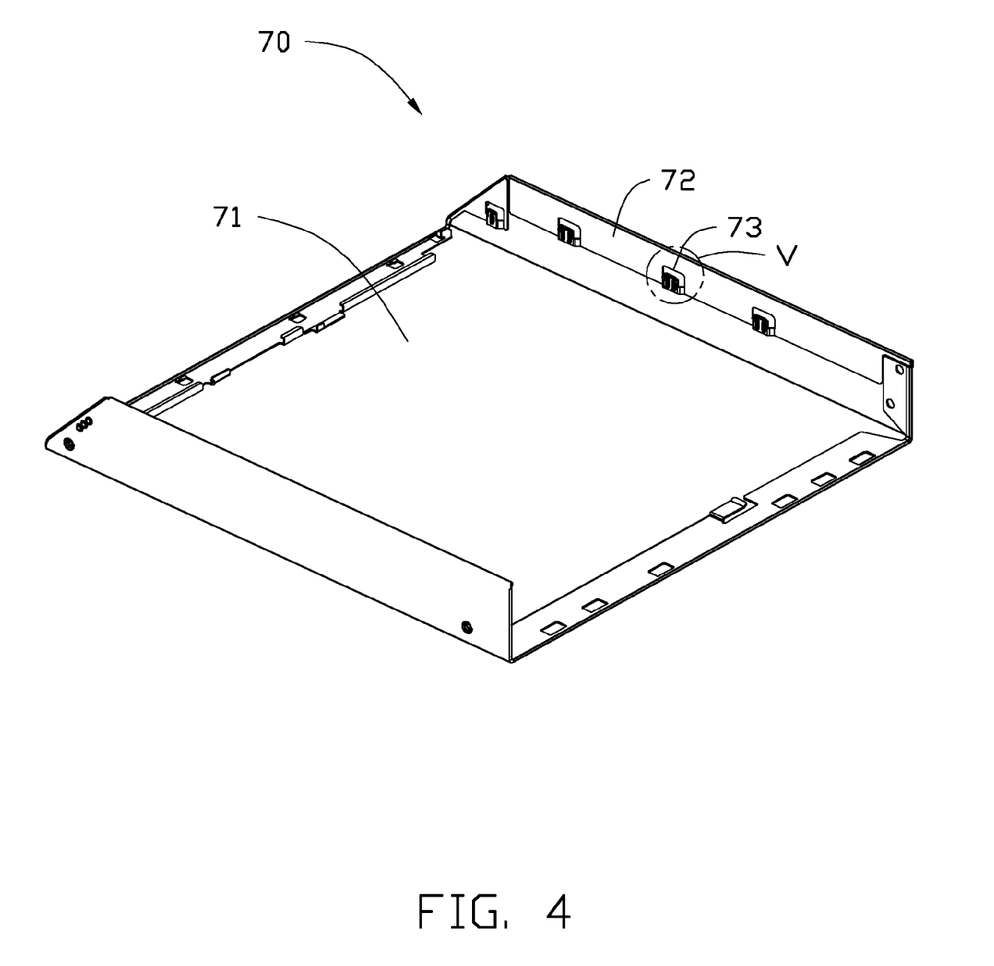
FIG. 4 is a schematic view of a rotatable sidewall of the computer case of FIG. 2.
Figure 5:
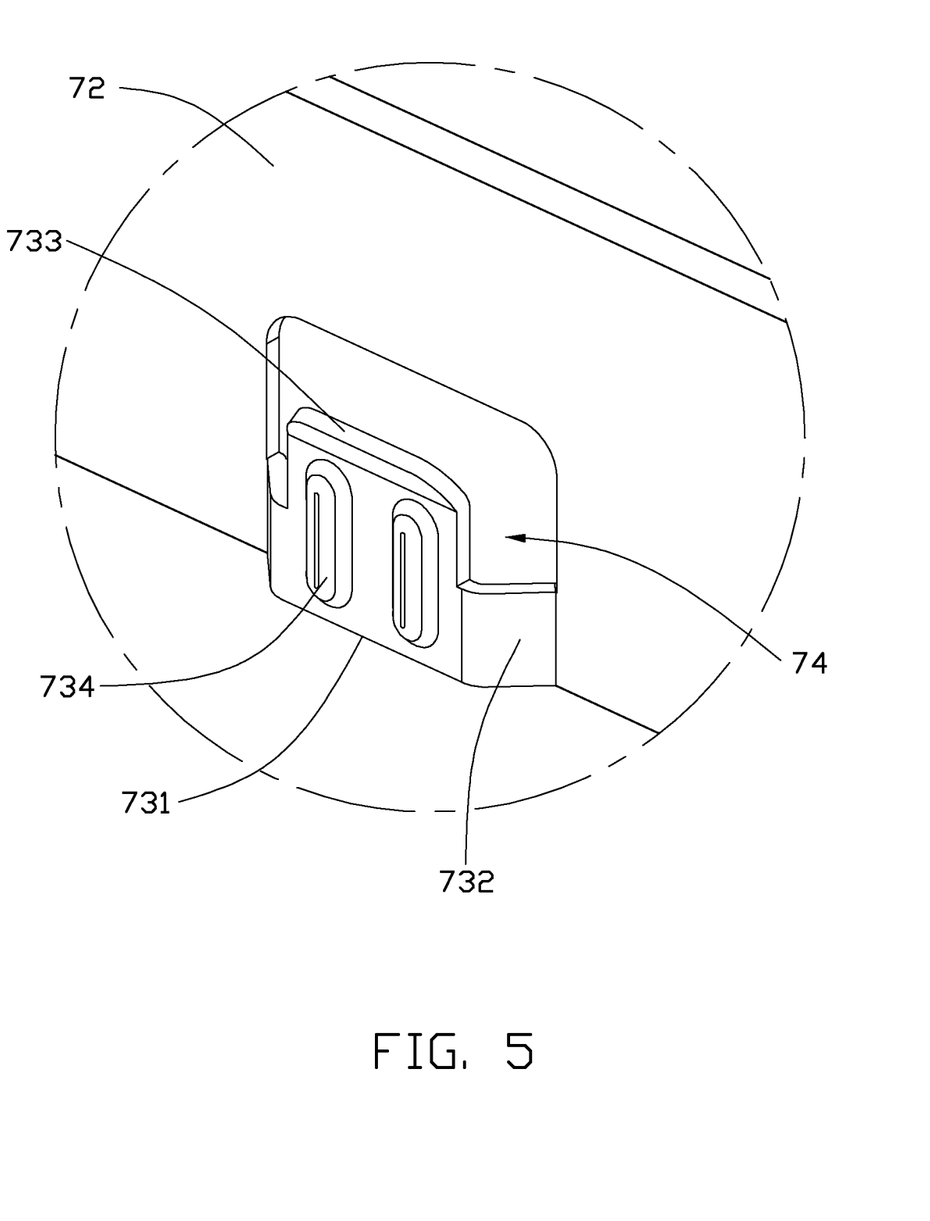
FIG. 5 is an enlarged, schematic view of part of the sidewall of FIG. 4.
Figure 6:
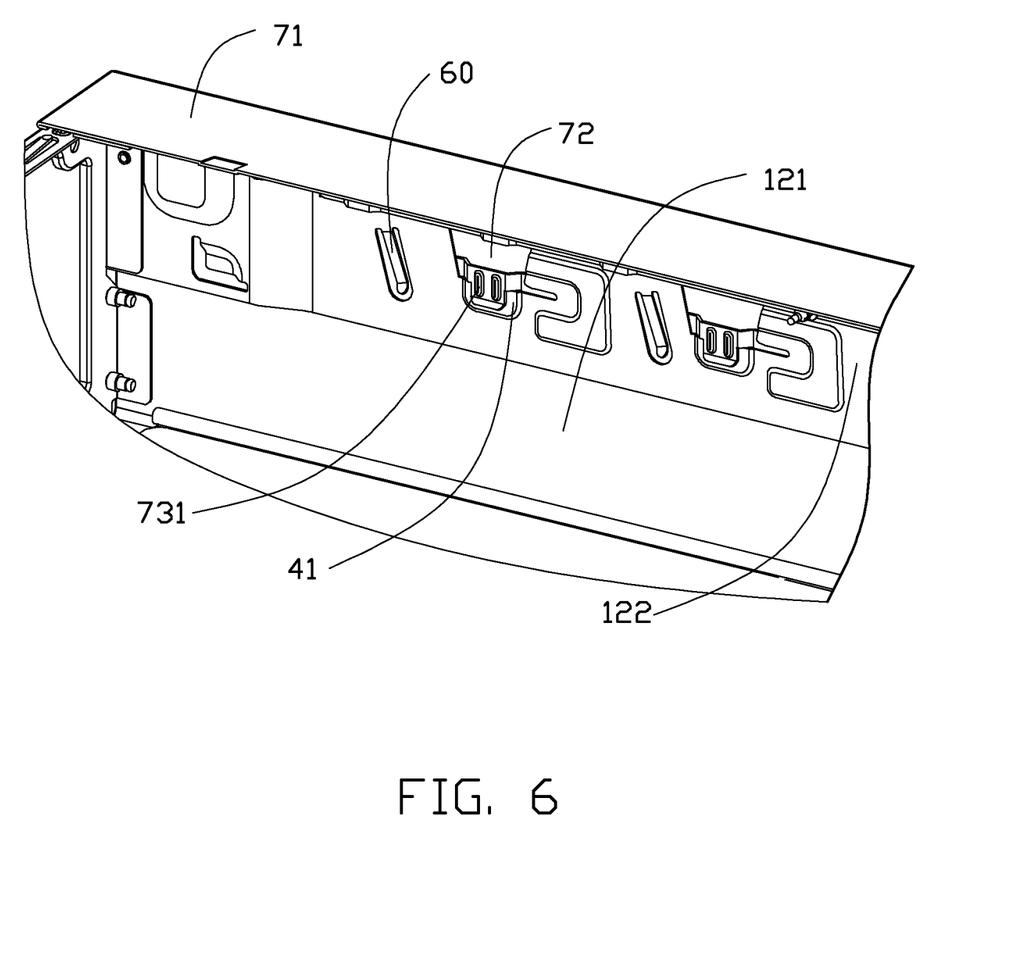
FIG. 6 is an assembled, schematic view of the rotatable sidewall engaged with a main body of the computer case of FIG. 4.

Referring to FIGS. 4 to 6, what is illustrated is a rotatable sidewall 70. The rotatable sidewall 70 includes a first main plate 71 and two first extending plates 72 extending downwardly from two opposite edges of the first main plate 71, corresponding to the two part 12. The first extending plates 72 are attached to an outer surface of the second part 122, and flushed with the outer surface of the first part 121. In this embodiment, a periphery of each first extending plate 72 near to the resisting portion 124 is a hypotenuse for engaging with the main body 10.

An inner surface of each first extending plate 72 defines a latching portion 73, for being engaged with the latching part 40 on the second part 122. In this embodiment, the number of the latching portion 73 is four. That is, the number of the latching portions 73 is equal to that of the latching part 40 correspondingly.

Specifically, each latching portion 73 includes a latching board 731, two bending sheets 732 connecting the latching board 731 with the first extending plate 72, and an assisting block 733 disposed at a bottom edge of the latching board 731. The latching board 731 is spaced from the first extending plate 72 by a gap 74. The latching portions 73 are attached to an inner surface of the latching plate 41. The two bending sheets 732 are disposed symmetrically at two sides of the latching board 731, and adjoined with top portions of the latching board 731 near to the first main plate 71. Heights of the bending sheets 732 are half of that of the latching board 731. The assisting block 733 of one first extending plate 72 extends inwardly and aslant and towards the other first extending plate 72, along the direction of the two side plate 12 near to each other. The assisting block 733 can strengthen the stability of the latching board 731. An inner surface of each latching board 731 can further define two convex columns parallel to each other to strengthen the stability of the latching board 731.

When the rotating type sidewall 70 and the main body 10 are assembled together, one end of the rotating sidewall 70 away from the resisting portion 124 snaps the main body 10 firstly, and then an opposite end near to the resisting portion 124 is rotated to attached to the main body 10. Specifically, the two first extending plates 72 are operated to snap the outer surface of the second part 122, and a top edge of the third part 126 is operated to resist an inner periphery of the first main plate 71. Furthermore, the latching portion 73 is attached to the inner surface of the latching plate 41. That is the latching plate 41 is disposed in the gap 74 between the latching portion 73 and the first extending plate 72, and the elastic slice 62 of the elastic structure 60 resists the inner surface of the first extending plate 72.

Figure 7:
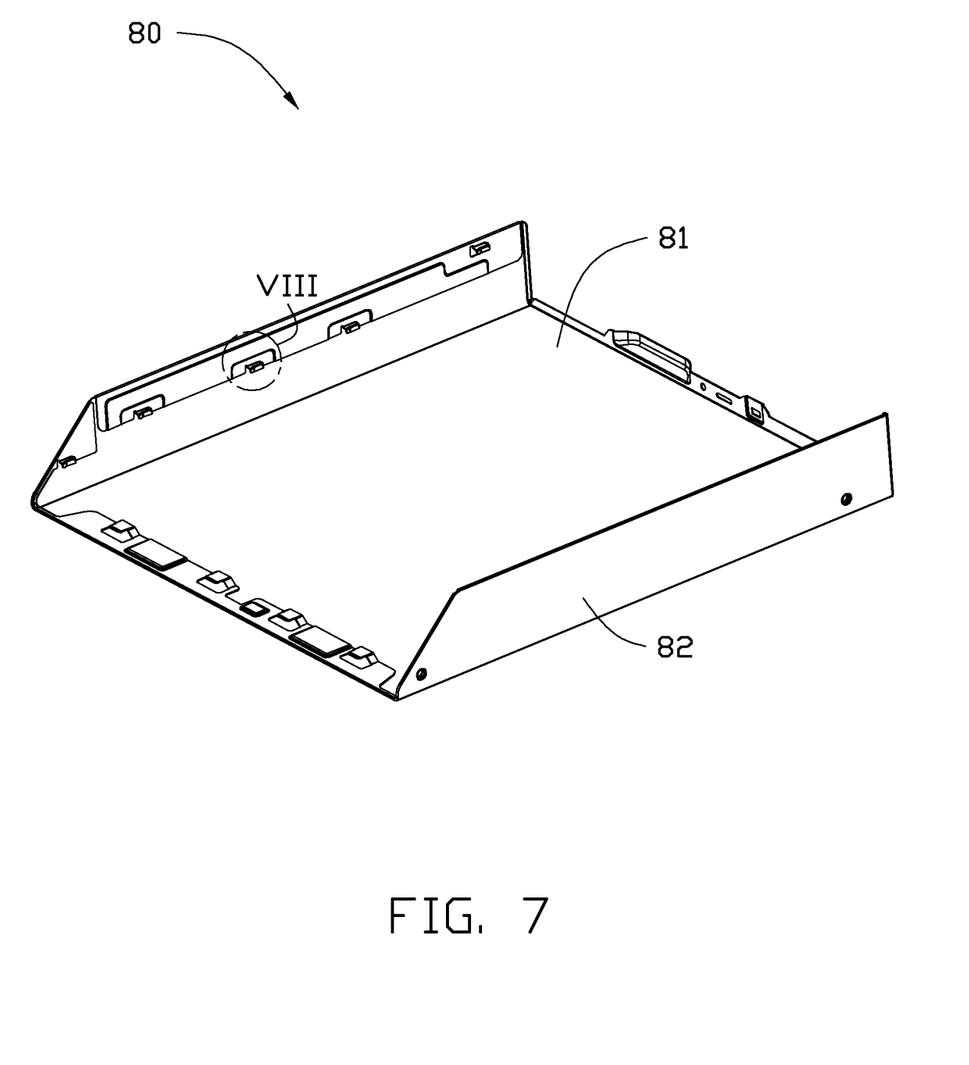
FIG. 7 is a schematic view of a pushable sidewall of the computer case of FIG. 2.
Figure 9:
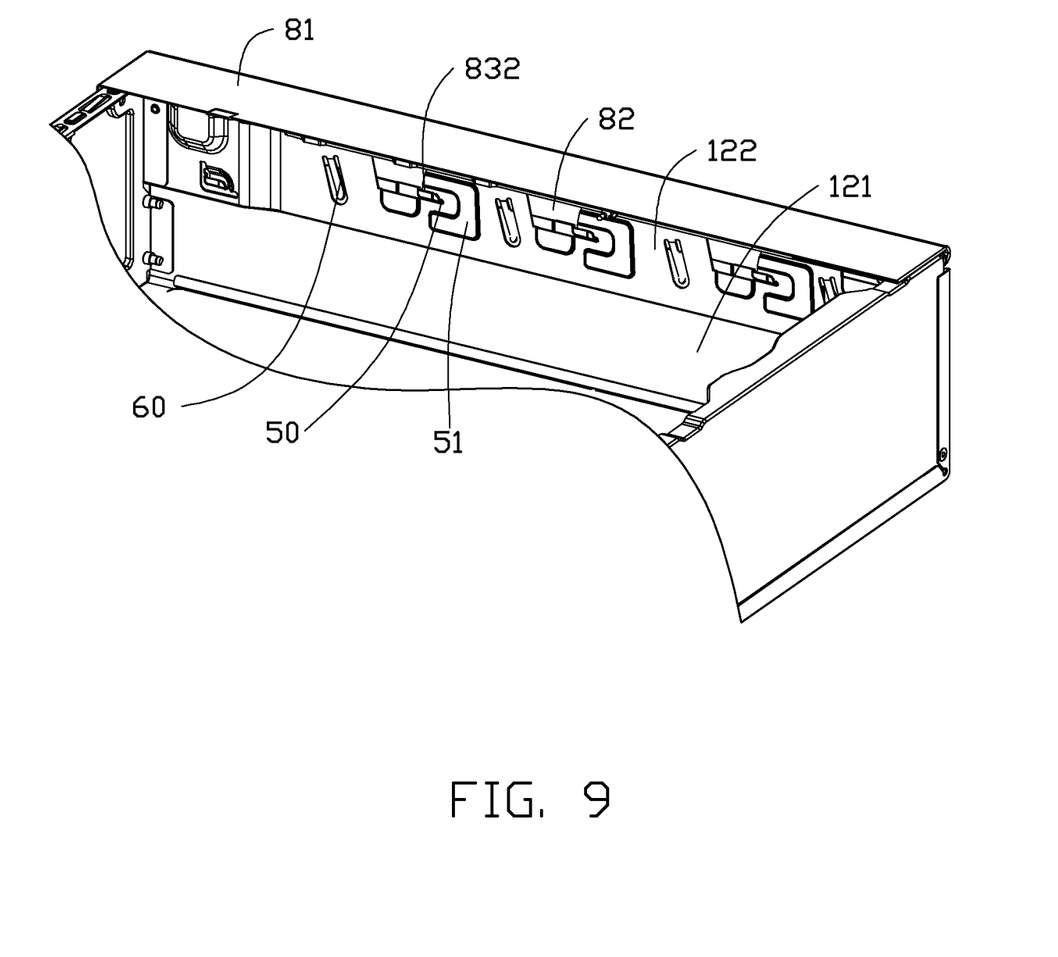
FIG. 9 is an assembled, schematic view of the pushable sidewall engaged with a main body of the computer case of FIG. 7.

Referring to FIG. 7 and FIG. 9, a pushable sidewall 80 is provided. The overall structure of the pushable sidewall 80 is similar to that of the rotatable sidewall 70. The pushable sidewall 80 includes a second main plate 81 and two second extending plates 82 extending downwardly from two opposite edges of the second main plate 81, corresponding to the two side plates 12. The second extending plate 82 are attached to the outer surface of the second part 122, and flushed with the outer periphery of the first part 121. In this embodiment, a periphery of each second extending plate 82 near to the resisting portion 124 is a hypotenuse for being engaged with the main body 10.

Figure 8:
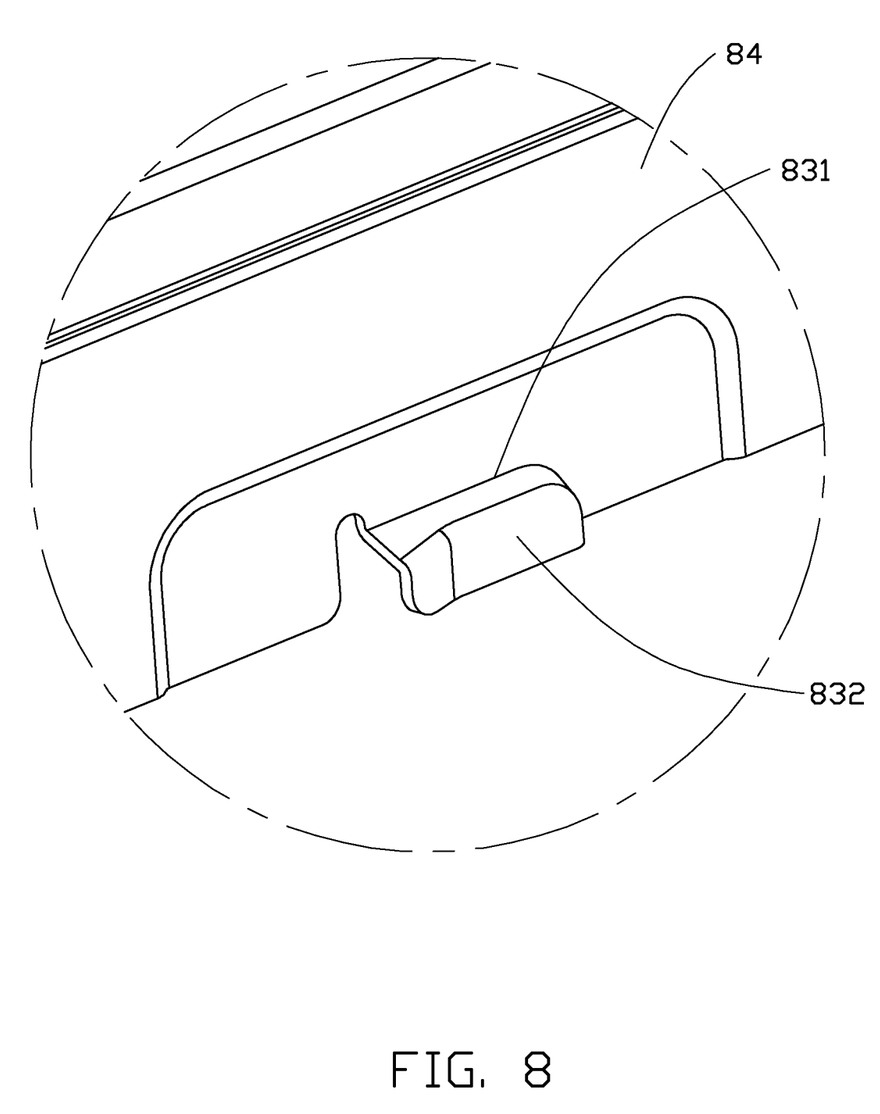
FIG. 8 is an enlarged, schematic view of the pushable sidewall of FIG. 7.

Each inner surface of the second extending plate 82 defines an operating portion 83, the operating portion 83 is inserted into the sliding groove 50 to assemble the sidewall 20 and the main body 10 together. In this embodiment, the number of the operating portion 83 is four. That is, the number of the operating portions 83 is equal to that of the sliding grooves 50.

Specifically, each operating portion 83 includes a positioning plate 831 and an operating plate 832 connected to the positioning plate 831. Each positioning plate 831 of one second extending plate 82 extends inwardly and horizontally from an inner surface of the second extending plate 82 towards the other second extending plate 82. The positioning plate 831 has an "L" shape. The operating plate 832 extends upwardly to the second main body 82, from a free end of the positioning plate 831.

When the pushable sidewall 80 and the main body 10 are assembled together, the pushable sidewall 80 is snapped on the main body 10 firstly. Specifically, the two second extending plates 82 are attached to the outer surface of the second part 122, the top edge of the third part 126 is operated to resist the inner periphery of the second main plate 81. The outer surface of the second extending plate 82 is flushed with the outer surface of the first part 121. Furthermore, the positioning plate 831 is pushed horizontally into the sliding groove 50, and the operating plate 832 is disposed at an inner side of the second part 122.

Additionally, part of the second part 122 surrounding each sliding groove 50 is depressed inwardly to form a dent 51, correspondingly, the inner surface of the two extending plate 82 surrounding the operating portion 83 defines a bump 84 corresponding to the dent 51. In this embodiment, the shape of the bump 84 is matched with the dent 51, whereby the bump 84 is embedded in the dent 51 to decrease a distance between the second part 122 and the second extending plate 82, and assist securing the computer case 100. Alternatively, the shape of the dent 51 and the bump 84 can also be unmatched, only for strengthening stability of main body 10 and sidewall 20.

Since the computer case 100 includes a main body 10 with latching part 40 and sliding grooves 50 applicable for two different types of sidewalls 20, different molds are unnecessary anymore, and the cost thereof is now rational.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A computer case, comprising:
   a main body with a bottom plate and two side plates extending upwardly from two opposite edges of the bottom plate; and
   a sidewall assembled to the main body;
   wherein each side plate comprises:
      a positioning portion;
      a latching part defined on the positioning portion; and
      a sliding groove adjacent to the latching part, wherein the latching part and the sliding groove are for securing different types of sidewalls respectively.

2. The computer case of claim 1, wherein each side plate further comprises a first part and a second part extending upwardly to the sidewall from an inner periphery of the first part, the positioning portion being formed on the second part.

3. The computer case of claim 2, wherein one side of the first part adjacent to the sliding groove defines a resisting portion extending upwardly towards the sidewall.

4. The computer case of claim 3, wherein the resisting portion has a right-angled triangle shape with a hypotenuse periphery near the second part.

5. The computer case of claim 2, wherein the latching part comprises a latching plate and a perforation formed on a top edge of the latching plate, and the latching plate of one side plate is depressed towards the other side plate.

6. The computer case of claim 5, wherein the sliding groove is located at a top periphery of the latching plate near the perforation, and is communicated to a bottom of the perforation, the sliding groove surrounding being depressed inwardly to form a dent.

7. The computer of claim 6, wherein the sidewall comprises a main plate and two extending plates extending downwardly from two opposite edges of the main plate corresponding to the side plates, the two extending plates being attached to the outer surface of the second part and flush with the outer surface of the first part.

8. The computer case of claim 7, wherein an inner surface of each extending plate defines a latching portion corresponding to the latching part, the latching portion is spaced from the extending plate with a gap therebetween, and the latching portion is snapped at the inner surface of the latching plate.

9. The computer case of claim 8, wherein the latching portion is connected to the extending plate via two symmetrical bending sheets, an assisting block is disposed at a bottom edge of the latching portion near the bottom plate, and the assisting block of one extending plate extends inwardly and aslant towards the other extending plate.

10. The computer case of claim 7, wherein an inner surface of each extending plates comprises a positioning plate extended inwardly and horizontally corresponding to the sliding groove, the positioning plate is embedded in the sliding groove, and an operating plate extends upwardly to the main plate from a free end of the positioning plate.

11. The computer case of claim 10, wherein the inner surface of the two extending plates surrounding the positioning plate defines a bump corresponding to the dent, and the bump is embedded in the dent.

12. The computer case of claim 10, wherein the positioning plate has an "L" shape.

13. The computer case of claim 2, wherein the side plate further comprises a third part, and a connecting plate connected to the third part and the second part, the third part extending upwardly from an inner side of the second part and attached to an inner surface of the sidewall.

14. The computer case of claim 13, wherein the connecting plate is vertical to the second part and the third part, and part of the connecting plate is depressed toward the third part corresponding to the latching part.

15. The computer case of claim 2, wherein an elastic structure is disposed on the second side plate near the positioning portion, and the elastic structure comprises a linear hole and an elastic slice positioned in the hole.

16. The computer case of claim 15, wherein the elastic slice obliquely extends outward from an outer surface of the second side plate.

* * * * *